United States Patent
Zhang et al.

(10) Patent No.: US 11,941,085 B2
(45) Date of Patent: Mar. 26, 2024

(54) EXTRACTING VIDEO CLIPS FROM VIDEOS FOR USE IN TRAINING A MACHINE-LEARNING MODEL

(71) Applicant: Halliburton Energy Services, Inc., Houston, TX (US)

(72) Inventors: Daili Zhang, Houston, TX (US); Varun Tyagi, Houston, TX (US); Fahad Ahmad, Houston, TX (US); Olivier Roger Germain, Houston, TX (US); Julien Christian Marck, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 344 days.

(21) Appl. No.: 17/524,100

(22) Filed: Nov. 11, 2021

(65) Prior Publication Data

US 2023/0141250 A1   May 11, 2023

(51) Int. Cl.
*G06T 7/20*   (2017.01)
*G06F 18/214*   (2023.01)
(Continued)

(52) U.S. Cl.
CPC ......... *G06F 18/2155* (2023.01); *G06N 20/00* (2019.01); *G06T 7/20* (2013.01);
(Continued)

(58) Field of Classification Search
CPC .... G06F 18/2155; G06N 20/00; G06V 20/49; G06V 20/45; G06V 20/46;
(Continued)

(56) References Cited

U.S. PATENT DOCUMENTS

2014/0326449 A1\* 11/2014 Samuel .................. E21B 41/00
                                                  340/853.3
2019/0385298 A1\* 12/2019 Torrione ............... E21B 17/006
(Continued)

FOREIGN PATENT DOCUMENTS

CN         210110004 U     2/2020

OTHER PUBLICATIONS

PCT App. No. PCT/US2021/058913, "International Search Report and Written Opinion", dated Aug. 8, 2022, 8 pages.

*Primary Examiner* — Syed Haider
(74) *Attorney, Agent, or Firm* — Kilpatrick Townsend & Stockton LLP (57) ABSTRACT

A video clip showing a wellsite activity can be extracted from a video and then labeled for use in training a machine-learning model in some examples described herein. In one such example, a system can train a model with a set of training data to identify an object and a corresponding spatial location of the object in each image frame in a video depicting a wellsite activity. The system can analyze image frames in the video using the trained model to identify a target image frame in which the object is present in a predefined spatial area thereof, where the predefined spatial area is associated with the wellsite activity. The system can then generate a video clip that includes only a subpart of the video based on the target image frame, where the subpart includes a series of consecutive image frames containing the target image frame.

20 Claims, 5 Drawing Sheets

(51) Int. Cl.
*G06N 20/00* (2019.01)
*G06V 20/40* (2022.01)

(52) U.S. Cl.
CPC .............. *G06V 20/46* (2022.01); *G06V 20/49* (2022.01); *G06T 2207/10016* (2013.01); *G06T 2207/20081* (2013.01)

(58) Field of Classification Search
CPC . G06T 2207/20081; G06T 2207/10016; G06T 7/70
See application file for complete search history.

(56) References Cited

U.S. PATENT DOCUMENTS

| | | |
|---|---|---|
| 2020/0224525 A1* | 7/2020 | Parmeshwar ........... E21B 44/00 |
| 2020/0364464 A1 | 11/2020 | Mjayanarasimhan et al. |
| 2020/0401808 A1 | 12/2020 | Wu et al. |
| 2021/0063601 A1* | 3/2021 | DiFoggio ............... G06V 10/30 |
| 2021/0183224 A1* | 6/2021 | Michalopulos ...... G06V 40/103 |
| 2021/0222519 A1 | 7/2021 | Rosano et al. |
| 2021/0223428 A1* | 7/2021 | Li .......................... G06N 20/00 |

* cited by examiner

EXTRACTING VIDEO CLIPS FROM VIDEOS FOR USE IN TRAINING A MACHINE-LEARNING MODEL

TECHNICAL FIELD

The present disclosure relates generally to extracting video clips from wellbore scene videos. More specifically, but not by way of limitation, this disclosure relates to extracting video clips from one or more videos for use in training machine-learning models to identify a target wellsite activity.

BACKGROUND

Wellsite activities can be performed at a wellsite that includes one or more wellbores for extracting hydrocarbons and natural resources from a subterranean formation. Several mechanical devices may be used to facilitate the wellsite activities during various stages of a well's life cycle, such as during the drilling process. For example, a top drive is one example of a mechanical device used at a wellbore to rotate a drill string during the drilling process. A top drive consists of one or more electric or hydraulic motors that are connected to the drill string via a short section of pipe. Top drives are able to drill with a three joint stand instead of just one pipe at a time. Thus, a top drive contributes to cost savings by reducing the frequency of stuck pipes. Other types of wellsite activities can also be performed at the wellbore.

In some cases, videos can be made of wellsite activities for further review by experts and for other purposes. The videos may be relatively long in length. For example, a video may a substantially continuous recording over weeks or months during which numerous wellsite activities are captured by one or more cameras. The wellsite activities may be performed by the same personnel or different personnel, or using the same mechanical devices or different mechanical devices, over the course of the video. These videos may be stored onsite at local servers or may be stored remotely, for example to a cloud computing environment.

DETAILED DESCRIPTION

Certain aspects and features of the present disclosure relate to a system that can identify a target frame in a video, where the target frame depicts a target wellsite activity being performed at a wellbore. The target frame can be identified using a model with action recognition capabilities. Examples of such models can include You Only Look Once version 5 (YOLO v5), Faster Region Based Convolutional Neural Networks (Fast R-CNN), and Single Shot MultiBox Detector (SSD) MobileNet, etc. The model can track a target object's spatial positioning (e.g., location and angle) across multiple frames in the video to identify a target frame in which the target object is spatially positioned in a way that is indicative of the target wellsite activity. The system can then extract a series of image frames on either side of the target frame in the video and compile the extracted image frames into a shorter video clip that purportedly depicts performance of the target wellsite activity. This process can be repeated dozens or hundreds of times on multiple videos to quickly and efficiently generate a set of video clips purportedly showing the target wellsite activity. The video clips can then be manually reviewed by a human or automatically analyzed and tagged with labels indicating whether the video clips do in fact show the target wellsite activity. Finally, the labeled video clips can be used as training data in a supervised training process to train a machine-learning model to detect the target wellsite activity in other videos. One example of the machine-learning model can be a neural network. In this way, a two-stage process can be implemented to rapidly generate training data for subsequent use in training a machine-learning model that can detect the target wellsite activity in other videos.

The system can track the movement of one target object or multiple target objects across the video frames in the video to locate one or more target frames associated with the target wellsite activity. Examples of the target objects can include humans (e.g., workers and machine operators), mechanical devices (e.g., a torque wrench, top drive, elevator, slips, or tongs), fluids, electronic devices (e.g., computers and servers), fluid control devices (e.g., pumps, valves, ports, conduits, etc.), robots or drones, or any combination of these. Each time a target frame associated with the target wellsite activity is identified in the video, that target frame and a predefined number of its adjacent video frames can be extracted from the video and compiled into a separate video clip, which can be stored for subsequent labeling and use as training data. In this way, multiple video clips showing the target wellsite activity can be quickly and efficiently generated from a single video.

Identifying a target wellsite activity in a video may be an important part of a process for understanding, for example, an overall workflow at a wellbore or why a particular event such as a blowout occurred downhole. But it may be challenging to identify target wellsite activities in videos. In some cases, a human may perform this analysis by manually reviewing dozens or hundreds of hours of video footage. But that approach is time consuming, tedious, and error prone. In other cases, computerized video-analysis techniques may be performed on the videos. But those other techniques may be inaccurate, slow, and computationally intensive. Some such techniques require enormous computational costs in terms of processor consumption, memory consumption, and time, given the complexity involved. Some techniques may require so much time that they cannot be implemented in real time, such as on a real-time video stream. But some examples of the present disclosure can overcome one or more of these problems by providing a rapid approach to generate training data for a machine-learning model, where the trained machine-learning model can then be used to quickly and efficiently identify a target wellsite activity in a video. The trained machine-learning model may consume less computing resources than conventional approaches and may be fast enough to identify target wellsite activities in real-time video streams as well as in stored video recordings.

It can also be challenging to manually parse through long videos, which may be days or weeks in length, to identify video frames that show a target wellsite activity and generate corresponding labeled video clips. Labeling such big data sets can be very tedious and time consuming. But some examples of the present disclosure can overcome this issue by implementing object detection techniques that automatically identify relevant video frames by tracking the movement of one or more target objects in a video. Since the object detection is relatively accurate, most of the identified video frames may include the target wellsite activity. A user can then manually confirm which video frames do, or do not, include the target wellsite activity and label the video clips accordingly. This approach can balance speed/efficiency with accuracy in generating the training data. The resulting labeled video clips can then be used to train a machine-learning model to detect the target wellsite activity, where the trained machine-learning model can have a higher degree of accuracy than the object detection models that were initially used to generate the video clips.

These illustrative examples are provided to introduce the reader to the general subject matter discussed here and are not intended to limit the scope of the disclosed concepts. The following sections describe various additional features and examples with reference to the drawings in which similar numerals indicate similar elements but, like the illustrative examples, should not be used to limit the present disclosure.

Figure 1:
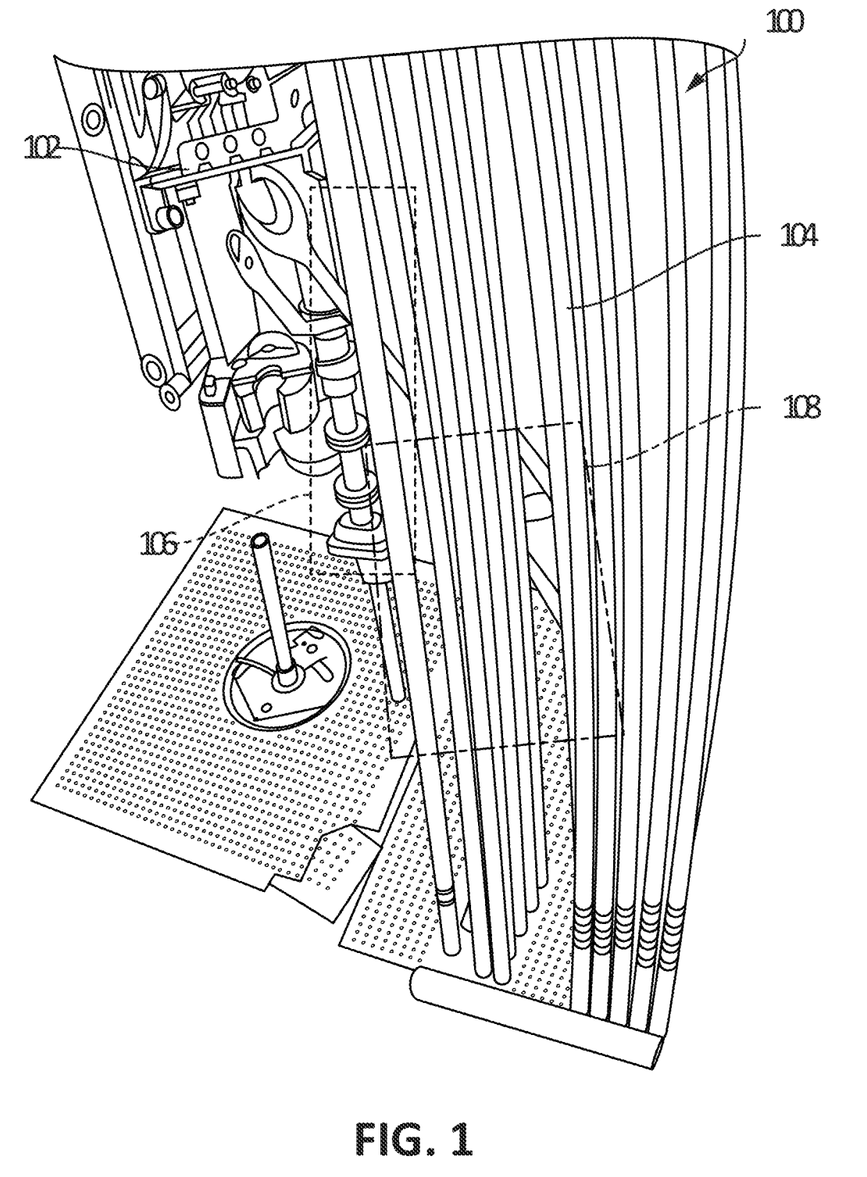
FIG. 1 depicts an example of a video frame showing a wellsite activity scene with a top drive according to some aspects of the present disclosure.

FIG. 1 depicts an example of a video frame showing a wellsite activity scene with a top drive 102 according to some aspects of the present disclosure. As shown in the video frame, the wellbore 100 includes a top drive 102, spare pipes 104, a particular part 106 of the top drive 102, and a predefined zone 108. During the wellsite activity, the top drive 102, which can be a target object for use in object tracking, can grab one of the spare pipes 104 for use in a drilling operation on the rig. During this process, the particular part 106 of the top drive 102 may move into the predefined zone 108. Thus, it may be possible to detect performance of the wellsite activity by tracking movement of the target object across video frames to detect a video frame in which the particular part 106 enters the predefined zone 108.

When the potential wellsite activity is detected at a frame in the video, a relatively short portion of video that contains the wellsite activity can be extracted from the original video and saved as a video clip. The amount of video extracted from the original video clip for use in generating the video clip may be customizable, for example so that the video clip only spans a particular length of time (e.g., 30 seconds or a minute) or only spans a particular number of video frames. An analyst can then manually review the video clip to determine whether the wellsite activity did in fact occur in that video clip and label the video clip as either containing or not containing the wellsite activity.

In some examples, the particular part 106 of top drive 102 can be used as the point of reference to determine whether the top drive 102 has in fact entered into the predefined zone 108. When the part 106 of the top drive 102 enters into the predefined zone 108, there is a short time period before and after that moment that can form a time window in which the potential wellsite activity occurred. The image frames corresponding to that time window can be extracted from the video and stored as a separate video clip associated with the wellsite activity.

The particular part 106 can be a subpart of the top drive 102 that may be selected for tracking to determine whether the wellsite activity occurred in the video. In some examples, the particular part 106 can be a main component used to perform the wellsite activity. Taking the top drive 102 as an example, the top drive 102 includes a mechanical arm that is capable of grabbing the spare pipes 104 shown in central area of the FIG. 1. Therefore, it is not necessarily to track the entire top drive 102, since movement of the part 106 can provide a sufficient basis on which to conclude that the wellsite activity potentially occurred in the video. In the other words, tracking movement of just the particular part 106 is sufficient for use in determining whether the wellsite activity potentially occurred in the video. In some examples, the particular part 106 to be tracked can be determined based on human experience or depending on what type of wellsite activity is to be detected, and what target objects (e.g., top drive 102) participate in the wellsite activity.

Figure 2:
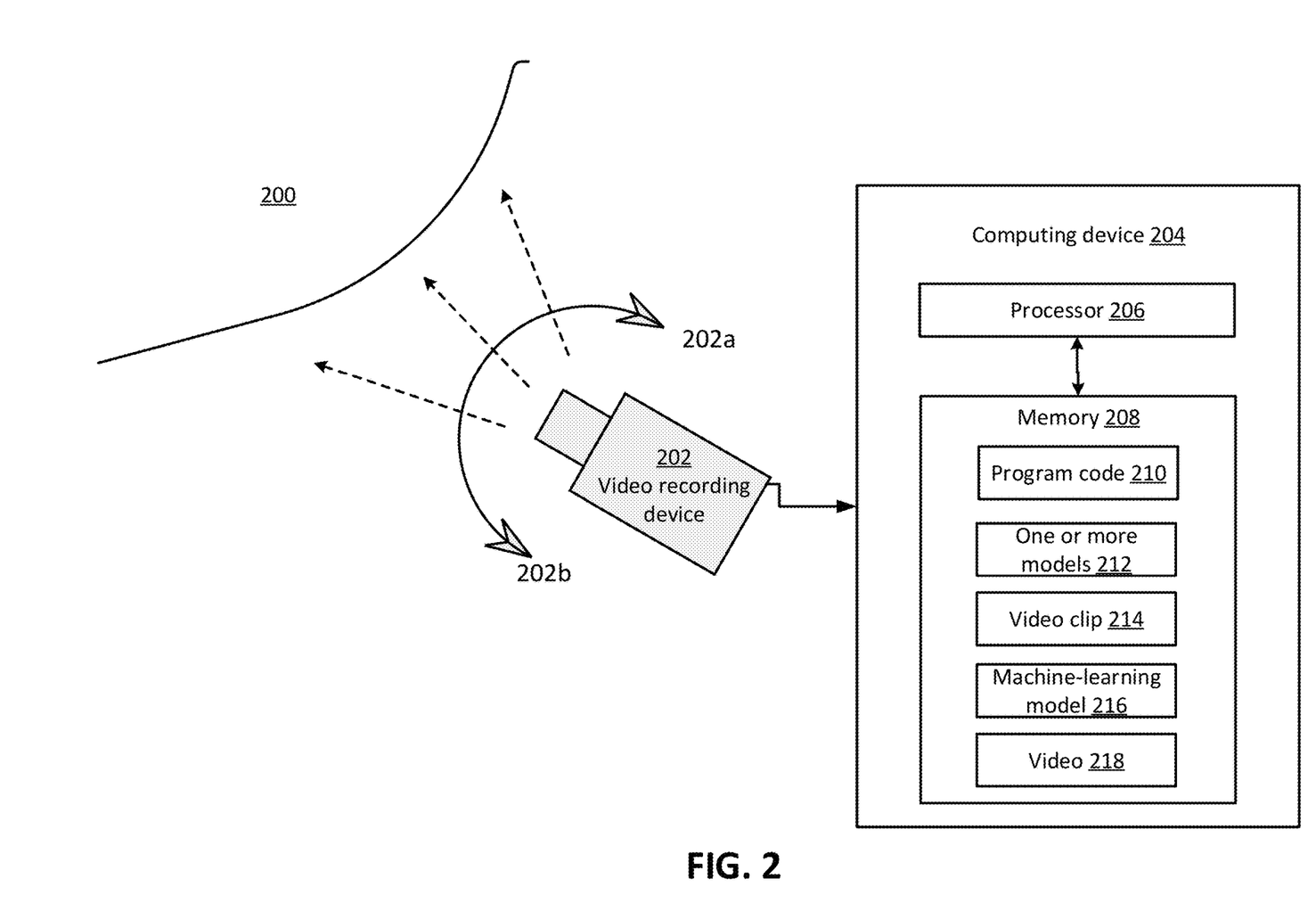
FIG. 2 depicts an example of a system for recording a video for generating a video clip according to some aspects of the present disclosure.

FIG. 2 depicts an example of a system for recording a video 218 at a wellsite 200 according to some aspects of the present disclosure. The wellsite 200 may include any number and combination of components, such as the top drive 102 and the spare pipes 104 as shown in FIG. 1. A video recording device 202 such as one or more cameras can be used to capture a video 218 (e.g., a wellsite activity video).

The video recording device 202 can be positioned outside of a wellbore at the wellsite 200 or inside of the wellbore at the wellsite 200. The video recording device 202 can be stationary or movable. For example, the video recording device 202 can be positioned at different angles over the course of a video recording. In some such examples, the video recording device 202 can be oriented in a first direction to a first position 202a during a first part of the video recording, and oriented in a second direction to a second position 202b during a second part of the video recording. This may provide greater recording coverage of the wellsite 200.

A computing device 204 can be used in conjunction with the video recording device 202 for implementing some aspects of the present disclosure. The computing device 204 can be electronically connected to the video recording device 202 for transmitting and receiving video data (e.g., digital or analog image data) from the video recording device 202 and then for processing the video data into a video clip using one or more of the techniques described herein.

The computing device 204 can include a processor 206 communicatively coupled to a memory 208. The processor 206 is hardware that can include one processing device or multiple processing devices. Non-limiting examples of the processor 206 include a Field-Programmable Gate Array (FPGA), an application-specific integrated circuit (ASIC), or a microprocessor. The processor 206 can execute program code 210 stored in the memory 208 to perform computing operations. The program code 210 may include processor-specific instructions generated by a compiler or an interpreter from code written in any suitable computer-programming language, such as C, C++, C#, Python, or Java.

The memory 208 can include one memory device or multiple memory devices. The memory 208 can be volatile or can be non-volatile, such that it can retain stored information when powered off. Some examples of the memory 208 can include electrically erasable and programmable read-only memory (EEPROM), flash memory, or any other type of non-volatile memory. At least some of the memory 208 includes a non-transitory computer-readable medium from which the processor 206 can read program code 210. A computer-readable medium can include electronic, optical, magnetic, or other storage devices capable of providing the processor 206 with computer-readable instructions or other program code. Some examples of a computer-readable medium include magnetic disks, memory chips, ROM, random-access memory (RAM), an ASIC, a configured processor, optical storage, or any other medium from which a computer processor can read the program code 210.

In some examples, the processor 206 can execute the program code 210 to implement some or all of the functionality described herein. For example, the processor 206 can perform object detection or tracking on the video 218 received from the video recording device 202 and generate a relatively short video clip 214 from the longer video 218. To perform this object detection and tracking, the processor 206 can execute one or more models 212, which may for example be trained from a set of non-labelled training data using an unsupervised training approach. Once trained, the models 212 can identify target image frames associated with a target wellsite activity from the video 218. The processor 206 can then generate a video clip 214 based on the target image frame. The video clip 214 can be labeled and then used in part of a supervised training process to train a machine-learning model 216, which can then be used to identify the target wellsite activity in other videos. The trained machine-learning model 216 may be more accurate than the one or more models 212 used to generate the video clip 214.

Figure 3:
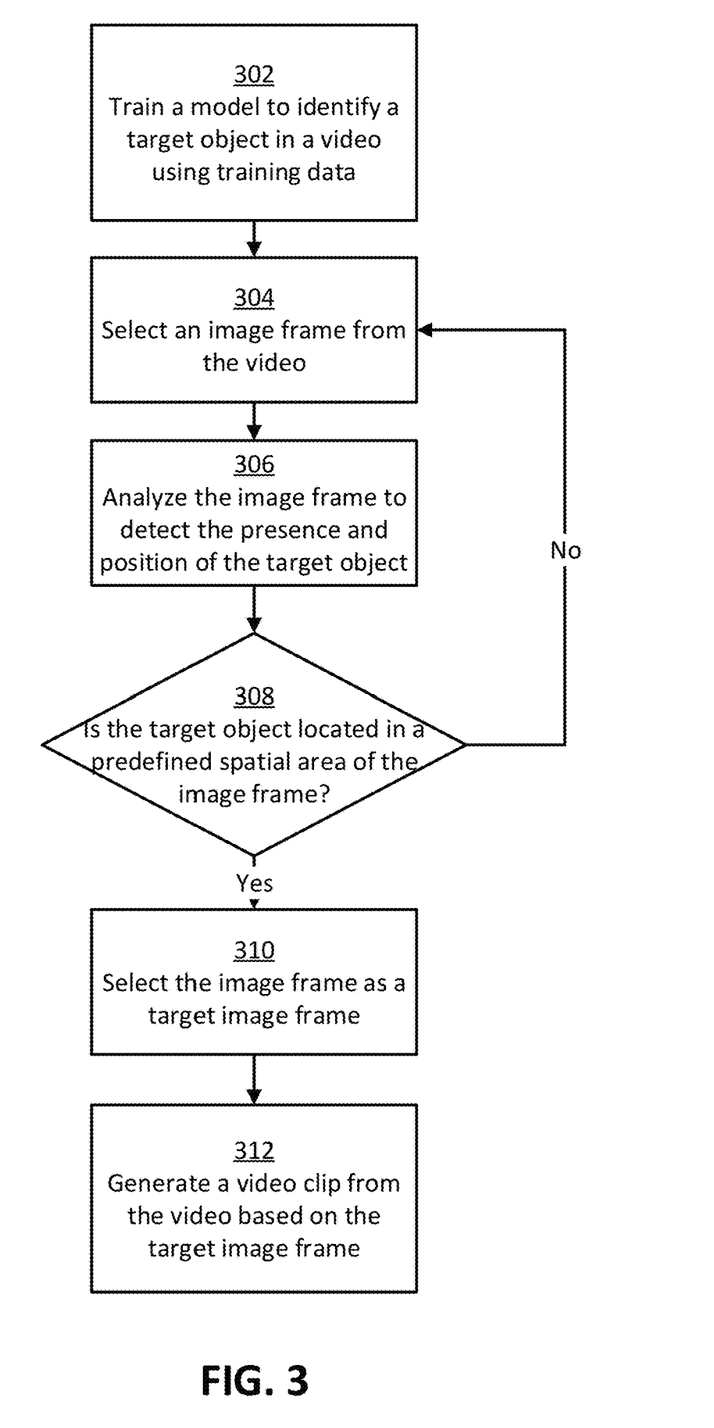
FIG. 3 depicts a flow chart of an example of a process for generating a video clip according to some aspects of the present disclosure.

FIG. 3 depicts a flow chart of an example of a process for generating a video clip according to some aspects of the present disclosure. But other examples may include more operations, fewer operations, different operations, or a different order of the operations shown in FIG. 3. The process of FIG. 3 is described below with reference to the components of FIG. 2 described above.

In block 302, the processor 206 trains a model 212 to identify a target object in a video 218 using training data. The model 212 can be trained by applying an unsupervised method with non-labelled training data or by applying a supervised method with labelled training data. Examples of the model 212 can include YOLO v5, faster R-CNN, and SSD MobileNet, etc. But other types of models may also be used.

In block 304, the processor 206 selects an image frame from a set of consecutive image frames defining the video 218 to analyze.

In block 306, the processor 206 analyzes the selected image frame to detect the presence and position of the target object in the image frame. The processor 206 may analyze the selected image frame using the model 212. If the image frame contains a scene in which the target object, which for example can be a top drive 102, is positioned in a predefined spatial area of the image frame, then the image frame may be showing the target wellsite activity.

In the example shown in FIG. 1, the predefined spatial area can correspond to the predefined zone 108. In other examples, the predefined spatial area can correspond to other locations in the image frame. When the target object is within the predefined spatial area of the image frame, it may mean that the image frame is likely showing a target wellsite activity, such as grabbing a spare pipe in the example of FIG. 1.

In block 308, the processor 206 determines whether the target object is located in the predefined spatial area. If the target object is not located in the predefined spatial area, the processor 206 may determine that the image frame does not depict the target wellsite activity and return to block 304, where it may select another image frame in the video 218 for analysis. If the target object in fact is present in the predefined spatial area, then the process can proceed to block 310 where the image frame is selected as a target image frame for use in generating a video clip 214.

In some examples, the processor 206 can further receive positional data indicating a spatial position (e.g., angle and location) of the video recording device 202. For example, the processor 206 can receive positional data indicating the spatial positions of the video recording device 202 over the course of a video recording, where the spatial positions may change over the course of the video recording. The positional data may, for example, include angle data indicating an angle of the video recording device 202 relative to a reference direction. In some examples, the positional data may be received from a drive system coupled to the video recording device 202 for panning or tilting the video recording device 202. The positional data can be used by processor 206 as a factor to determine characteristics of the predefined spatial area, for example the shape and size of the predefined spatial area. Once the predefined spatial area has been determined, the processor 206 can determine whether the target object is present in the predefined spatial area in the image frame.

In some examples, a particular subpart of the target object can be designated for use in determining whether the target object is present in the predefined spatial area in the image frame. This may be because the location the particular subpart may be more important than the location of other parts of the target object in determining whether the target wellsite activity is occurring. As one particular example, the top drive 102 of FIG. 1 has a mechanical arm (e.g., particular part 106) connected with rotary joint to grab working spare pipes in the predefined zone 108. In this example, the mechanical arm's location is more important than the rest of the parts of the top drive 102 in the determination process and, therefore, the rest of the parts of the top drive 102 may be excluded from the tracking and determination process.

In block 310, the processor 206 selects the image frame as a target image frame for generating a video clip 214 from the original video 218. In some examples, the target image frame may include a corresponding timestamp. The timestamp can be used to generate a video clip 214 that spans a relatively short timeframe as compared to the original video 218, as described in greater detail below.

In block 312, processor 206 generates a video clip 214 that includes only a subpart of the video 218 based on the target image frame that was identified in block 310. The subpart of the video 218 contains (e.g., consists of) a series of consecutive image frames, in which the target image frame is included. In some examples, the processor 206 can select the series of consecutive image frames to span a time window around the target image frame, where the time window includes a first predetermined amount of time prior to the target image frame and a second predetermined amount of time subsequent to the target image frame. The first predetermined amount of time may be the same as, or different from, the second predetermined amount of time. In some examples, the first predetermined amount of time and the second predetermined amount of time may be user customizable. More details about using the target image frame to generate the video clip 214 will now be described below with reference to FIG. 4.

Figure 4:
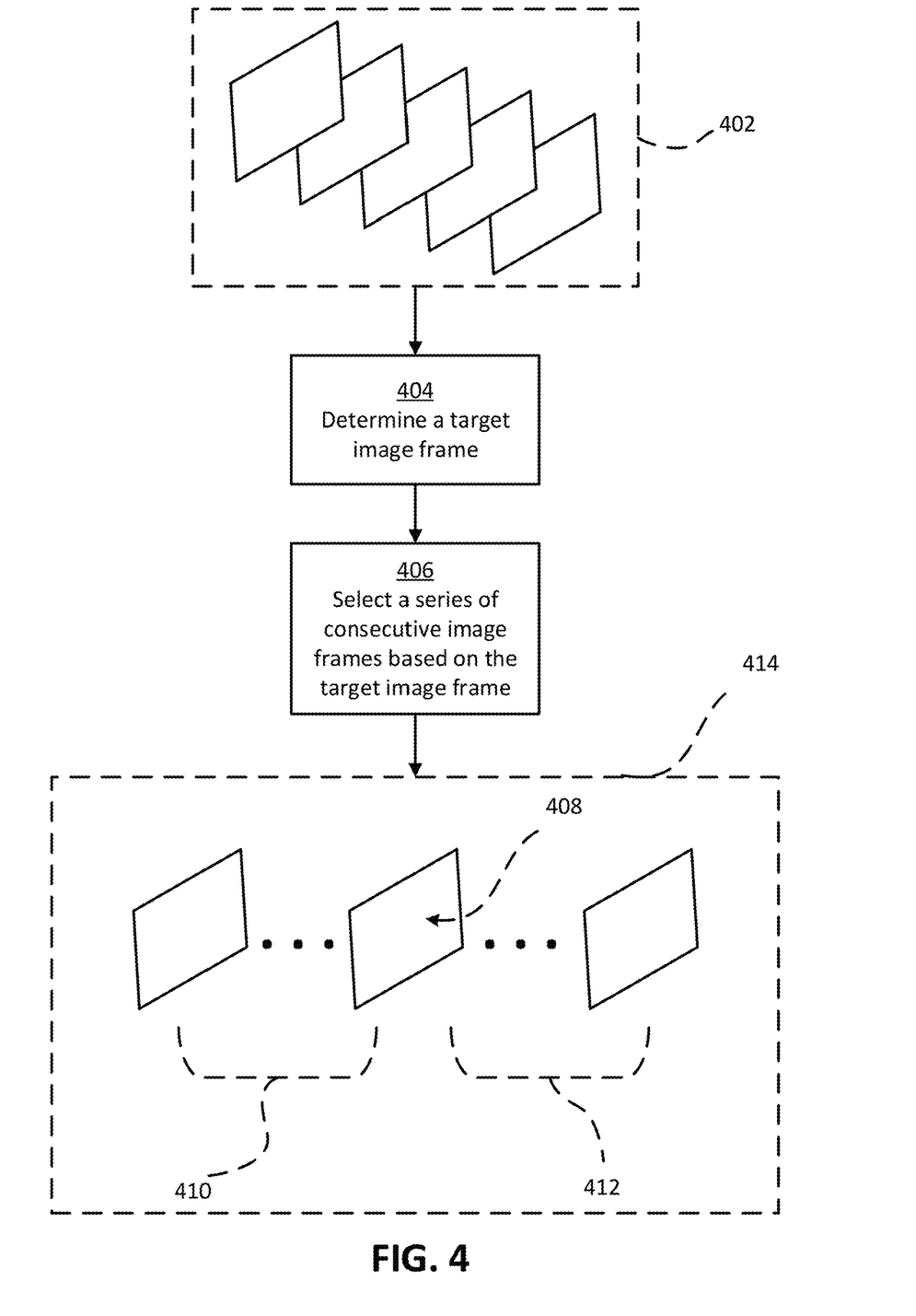
FIG. 4 depicts a block diagram of an example of a process for extracting a series of image frames for use as a video clip according to some aspects of the present disclosure.

FIG. 4 depicts a block diagram of an example of a process for extracting a series of image frames from a video and using them to generate a video clip depicting a target wellsite activity according to some aspects of the present disclosure. The process of FIG. 4 is described below with reference to the components of FIG. 2 described above.

The process begins with a video 218 that contains a set of image frames, which are represented as rectangles in block 402. In block 404, a target image frame 408 is identified in the set of image frames. The determination process for the target image frame 408 is the same as described above in relation to FIG. 3. In block 406, a series of consecutive image frames 414 that includes the target image frame 408 are selected based on the target image frame 408. The series of consecutive image frames 414 can span a particular number of image frames or a particular time window. For instance, the selected series of consecutive image frames 414 includes a first predetermined amount of time 410 prior to the target image frame 408 and a second predetermined amount of time 412 subsequent to the target image frame 408. In some examples, the first predetermined amount of time 410 and second predetermined amount of time 412 can have the same duration (e.g., they may both be 20 seconds in duration). In other examples, the first predetermined amount of time 410 and second predetermined amount of time 412 can be different durations, such that the amount of time prior to the target image frame 408 does not equal the amount of time subsequent to the target image frame 408 in the video clip 214. Once the consecutive series of image frames has been selected, the processor 206 can extract the consecutive series of image frames 414 from the video 218 and use them to generate a video clip 214 showing the target wellsite activity.

Figure 5:
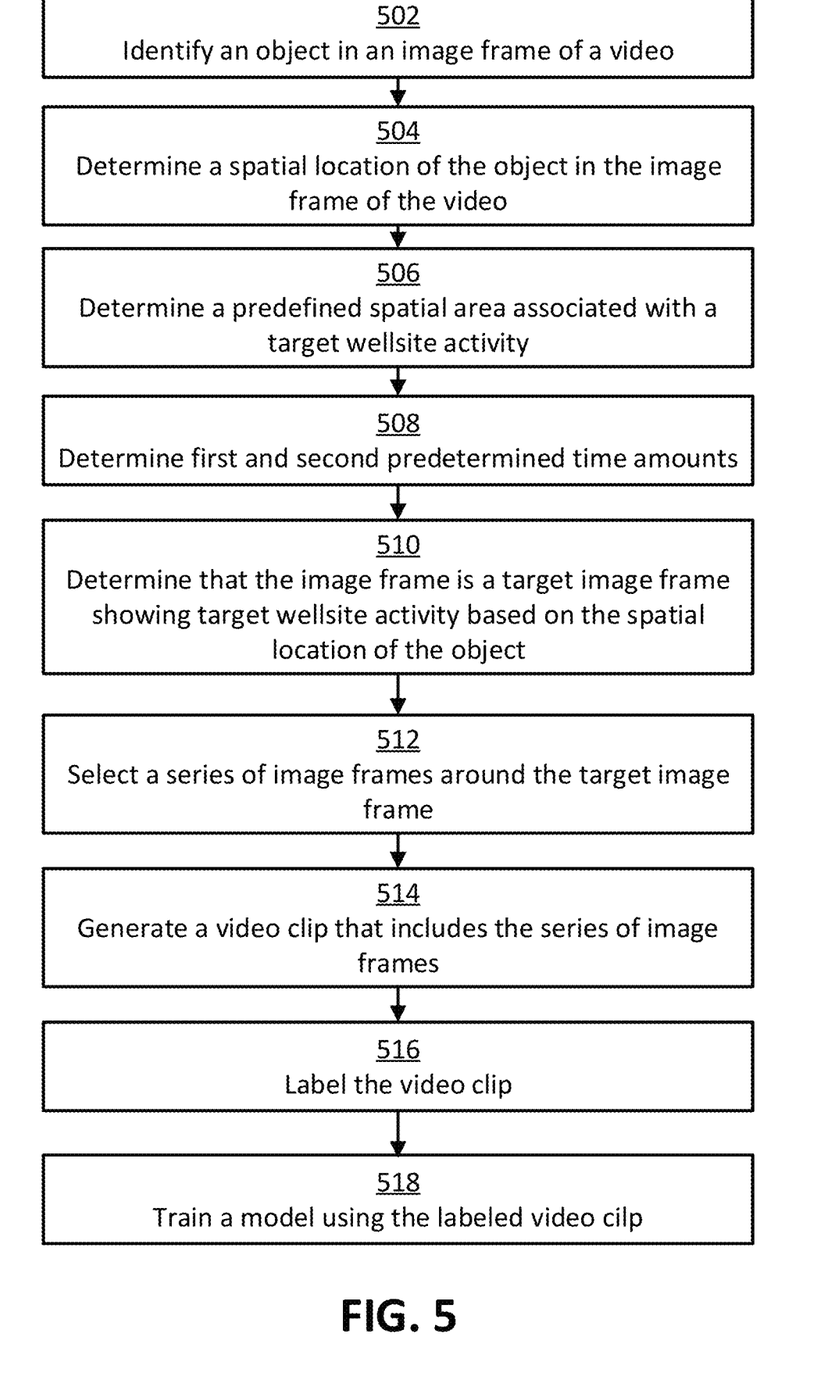
FIG. 5 depicts a flow chart of an example of a process according to some aspects of the present disclosure.

FIG. 5 depicts a flow chart of an example of a process according to some aspects of the present disclosure. But other examples may include more operations, fewer operations, different operations, or a different order of the operations shown in FIG. 5. The process of FIG. 5 is described below with reference to the components of FIG. 2 described above.

In block 502, a processor 206 identifies an object in an image frame of a video 218. The video 218 can be a wellsite activity video or another type of video showing something other than activity at a wellsite. The processor 206 can identify the object in the image frame using one or more models 212 (e.g., a trained model).

In block 504, the processor 206 determines a spatial location of the object in the image frame of the video 218. The processor 206 can determine the spatial location of the object using the one or more models 212. Positional data indicating the orientation of a video recording device 202 that captured the video 218 may be used as part of the process for determining the spatial location of the object in the image frame, as described above.

In block 506, the processor 206 determines a predefined spatial area associated with a target wellsite activity. The shape and coverage of the predefined spatial area may be determined based on the positional data in some examples. In other examples, the method of determining the predefined spatial area can vary depending on needs. For example, the predefined spatial area can be determined based on human experience or experimental result and provided as input to the processor 206.

In block 508, the processor 206 determines a first predetermined amount of time 410 and second predetermined amount of time 412 for use in generating a video clip 214. For example, this information can be input to the processor 206 as a user selected parameter and stored in memory for subsequent retrieval and use.

In block 510, the processor 206 determines that the image frame is a target image frame showing the target wellsite activity using any of the techniques described above. For example, the processor 206 can determine that the image frame is a target image frame based on the spatial location of the object overlapping with the predefined spatial area in the image frame.

In block 512, the processor 206 selects a series of image frames around the target image frame using any of the techniques described above. For example, the processor 206 can select the series of image frames based on the first predetermined amount of time and the second predetermined amount of time from block 508.

In block 514, the processor 206 generates a video clip 214 based on the target image frame. The video clip 214 can include the series of image frames determined in block 512 and span a time widow that is less than the full length of the original video 218. In some examples, the series image frames can be selected based on the time window, which may span the first predetermined amount of time 410 prior to the target image frame 408 and the second predetermined amount of time 412 subsequent to the target image frame 408, as shown in FIG. 4. The video clip 214 can then be stored for labeling.

In block 516, an analyst determines whether the target wellsite activity in fact occurred in the video clip 214 and labels the video clip 214 accordingly as result of the determination. Alternatively, the processor 206 may execute software to automatically label the video clip 214.

In block 518, the processor 206 trains another model to detect the target wellsite activity by using the video clip 214 as labeled training data. The other model can be a machine-learning model (e.g., machine-learning model 216), such as a neural network. Since video clip 214 is labeled, the model can be trained in a supervised machine-learning method. Once trained, the other model can be used to detect the target wellsite activity in other videos, which may be relatively long videos spanning days or weeks.

In some aspects, a machine-learning model can be used to extract a video clip from videos according to one or more of the following examples. As used below, any reference to a series of examples is to be understood as reference to each of those examples disjunctively (E.g., "Examples 1-4" is to be understood as Examples 1, 2, 3, or 4").

Example #1: A system including one or more processors and one or more memories including program code that is executable by the one or more processors for causing the one or more processors to perform operations. The operations can include training a model with a set of training data to identify an object and a corresponding spatial location of the object in each image frame in a video depicting performance of a wellsite activity; analyzing a plurality of consecutive image frames in the video using the trained model to identify a target image frame in which the object is present in a predefined spatial area thereof, wherein the predefined spatial area is associated with performance of the wellsite activity; and generating a video clip that includes only a subpart of the video based on the target image frame, the subpart including a series of consecutive image frames containing the target image frame.

Example #2: The system of Example #1 may feature the one or more memories further including program code that is executable by the one or more processors for causing the one or more processors to: track a movement of the object across a plurality of image frames in the video; and determine the target image frame based on the movement.

Example #3: The system of any of Examples #1-2 may feature the one or more memories further including program code that is executable by the one or more processors for causing the one or more processors to train the model by an unsupervised machine learning method with a set of non-labeled training data.

Example #4: The system of any of Examples #1-3 may feature the one or more memories further including program code that is executable by the one or more processors for causing the one or more processors to: designate a particular part within the object for use in determining whether the object is present in the predefined spatial area in the image frame; and select the target image frame based on determining that the particular part of the object is located in the predefined spatial area in the target image frame.

Example #5: The system of any of Examples #1-4 may feature the one or more memories further including program code that is executable by the one or more processors for causing the one or more processors to select the series of consecutive image frames to span a time window, wherein the time window includes a first predetermined amount of time prior to the target image frame and a second predetermined amount of time subsequent to the target image frame.

Example #6: The system of any of Examples #1-5 may feature the one or more memories further including program code that is executable by the one or more processors for causing the one or more processors to train another model to detect the wellsite activity by using the video clip as labeled training data.

Example #7: The system of any of Examples #1-6 may feature the one or more memories further including program code that is executable by the one or more processors for causing the one or more processors to: receive positional data indicating an angle of a video recording device used to record the video; and determine the predefined spatial area based on the angle of the video recording device.

Example #8: A computer-implemented method including training a model with a set of training data to identify an object and a corresponding spatial location of the object in each image frame in a video depicting performance of a wellsite activity; analyzing a plurality of consecutive image frames in the video using the trained model to identify a target image frame in which the object is present in a predefined spatial area thereof, wherein the predefined spatial area is associated with performance of the wellsite activity; and generating a video clip that includes only a subpart of the video based on the target image frame, the subpart including a series of consecutive image frames containing the target image frame.

Example #9: The method of Example #8 may include tracking a movement of the object across a plurality of image frames in the video; and determining the target image frame based on the movement.

Example #10: The method of any of Examples #8-9 may include training the model by an unsupervised machine learning method with a set of non-labeled training data.

Example #11: The method of any of Examples #8-10 may include designating a particular part within the object for use in determining whether the object is present in the predefined spatial area in the image frame; and selecting the target image frame based on determining that the particular part of the object is located in the predefined spatial area in the target image frame.

Example #12: The method of any of Examples #8-11 may include selecting the series of consecutive image frames to span a time window, wherein the time window includes a first predetermined amount of time prior to the target image frame and a second predetermined amount of time subsequent to the target image frame.

Example #13: The method of any of Examples #8-12 may include training another model to detect the wellsite activity by using the video clip as labeled training data.

Example #14: The method of any of Examples #8-13 may include receiving positional data indicating an angle of a video recording device used to record the video; and determining the predefined spatial area based on the angle of the video recording device.

Example #15: A non-transitory computer-readable medium comprising program code that is executable by one or more processors for causing the one or more processors to perform operations. The operations can include training a model with a set of training data to identify an object and a corresponding spatial location of the object in each image frame in a video depicting performance of a wellsite activity; analyzing a plurality of consecutive image frames in the video using the trained model to identify a target image frame in which the object is present in a predefined spatial area thereof, wherein the predefined spatial area is associated with performance of the wellsite activity; and generating a video clip that includes only a subpart of the video based on the target image frame, the subpart including a series of consecutive image frames containing the target image frame.

Example #16: The non-transitory computer-readable medium of Example #15 may include program code that is executable by the one or more processors for causing the one or more processors to: track a movement of the object across a plurality of image frames in the video; and determine the target image frame based on the movement.

Example #17: The non-transitory computer-readable medium of Example #15-16 may include program code that is executable by the one or more processors for causing the one or more processors to train the model by an unsupervised machine learning method with a set of non-labeled training data.

Example #18: The non-transitory computer-readable medium of Example #15-17 may include program code that is executable by the one or more processors for causing the one or more processors to train another model to detect the wellsite activity by using the video clip as labeled training data.

Example #19: The non-transitory computer-readable medium of Example #15-18 may include program code that is executable by the one or more processors for causing the one or more processors to: designate a particular part within the object for use in determining whether the object is present in the predefined spatial area in the image frame; and select the target image frame based on determining that the particular part of the object is located in the predefined spatial area in the target image frame.

Example #20: The non-transitory computer-readable medium of Example #15-19 may include program code that is executable by the one or more processors for causing the one or more processors to select the series of consecutive image frames to span a time window, wherein the time window includes a first predetermined amount of time prior to the target image frame and a second predetermined amount of time subsequent to the target image frame.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any examples described herein can be combined with any other examples to yield further examples.

What is claimed is:

1. A system comprising:
one or more processors; and
one or more memories including program code that is executable by the one or more processors for causing the one or more processors to:
train a model with a set of training data to identify an object and a corresponding spatial location of the object in each image frame in a video depicting performance of a wellsite activity;
analyze a plurality of consecutive image frames in the video using the trained model to identify a target image frame in which the object is present in a predefined spatial area thereof, wherein the predefined spatial area is associated with performance of the wellsite activity; and
generate a video clip that includes only a subpart of the video based on the target image frame, the subpart including a series of consecutive image frames containing the target image frame.

2. The system of claim 1, wherein the one or more memories further include program code that is executable by the one or more processors for causing the one or more processors to:
track a movement of the object across a plurality of image frames in the video; and
determine the target image frame based on the movement.

3. The system of claim 1, wherein the one or more memories further include program code that is executable by the one or more processors for causing the one or more processors to train the model by an unsupervised machine learning method with a set of non-labeled training data.

4. The system of claim 1, wherein the one or more memories further include program code that is executable by the one or more processors for causing the one or more processors to:
designate a particular part within the object for use in determining whether the object is present in the predefined spatial area in the image frame; and
select the target image frame based on determining that the particular part of the object is located in the predefined spatial area in the target image frame.

5. The system of claim 1, wherein the one or more memories further include program code that is executable by the one or more processors for causing the one or more processors to select the series of consecutive image frames to span a time window, wherein the time window includes a first predetermined amount of time prior to the target image frame and a second predetermined amount of time subsequent to the target image frame.

6. The system of claim 1, wherein the one or more memories further include program code that is executable by the one or more processors for causing the one or more processors to train another model to detect the wellsite activity by using the video clip as labeled training data.

7. The system of claim 1, wherein the one or more memories further include program code that is executable by the one or more processors for causing the one or more processors to:
receive positional data indicating an angle of a video recording device used to record the video; and
determine the predefined spatial area based on the angle of the video recording device.

8. A computer-implemented method comprising:
training a model with a set of training data to identify an object and a corresponding spatial location of the object in each image frame in a video depicting performance of a wellsite activity;
analyzing a plurality of consecutive image frames in the video using the trained model to identify a target image frame in which the object is present in a predefined spatial area thereof, wherein the predefined spatial area is associated with performance of the wellsite activity; and
generating a video clip that includes only a subpart of the video based on the target image frame, the subpart including a series of consecutive image frames containing the target image frame.

9. The method of claim 8, further comprising:
tracking a movement of the object across a plurality of image frames in the video; and
determining the target image frame based on the movement.

10. The method of claim 8, further comprising training the model by an unsupervised machine learning method with a set of non-labeled training data.

11. The method of claim 8, further comprising:
designating a particular part within the object for use in determining whether the object is present in the predefined spatial area in the image frame; and
selecting the target image frame based on determining that the particular part of the object is located in the predefined spatial area in the target image frame.

12. The method of claim 8, further comprising selecting the series of consecutive image frames to span a time window, wherein the time window includes a first predetermined amount of time prior to the target image frame and a second predetermined amount of time subsequent to the target image frame.

13. The method of claim 8, further comprising training another model to detect the wellsite activity by using the video clip as labeled training data.

14. The method of claim 8, further comprising:
receiving positional data indicating an angle of a video recording device used to record the video; and
determining the predefined spatial area based on the angle of the video recording device.

15. A non-transitory computer-readable medium comprising program code that is executable by one or more processors for causing the one or more processors to:
train a model with a set of training data to identify an object and a corresponding spatial location of the object in each image frame in a video depicting performance of a wellsite activity;
analyze a plurality of consecutive image frames in the video using the trained model to identify a target image frame in which the object is present in a predefined spatial area thereof, wherein the predefined spatial area is associated with performance of the wellsite activity; and
generate a video clip that includes only a subpart of the video based on the target image frame, the subpart including a series of consecutive image frames containing the target image frame.

16. The non-transitory computer-readable medium of claim 15, further comprising program code that is executable by the one or more processors for causing the one or more processors to:
track a movement of the object across a plurality of image frames in the video; and
determine the target image frame based on the movement.

17. The non-transitory computer-readable medium of claim 15, further comprising program code that is executable by the one or more processors for causing the one or more processors to train the model by an unsupervised machine learning method with a set of non-labeled training data.

18. The non-transitory computer-readable medium of claim 15, further comprising program code that is executable by the one or more processors for causing the one or more processors to train another model to detect the wellsite activity by using the video clip as labeled training data.

19. The non-transitory computer-readable medium of claim 15, further comprising program code that is executable by the one or more processors for causing the one or more processors to:
  designate a particular part within the object for use in determining whether the object is present in the predefined spatial area in the image frame; and
  select the target image frame based on determining that the particular part of the object is located in the predefined spatial area in the target image frame.

20. The non-transitory computer-readable medium of claim 15, further comprising program code that is executable by the one or more processors for causing the one or more processors to select the series of consecutive image frames to span a time window, wherein the time window includes a first predetermined amount of time prior to the target image frame and a second predetermined amount of time subsequent to the target image frame.

* * * * *